United States Patent [19]

Carter

[11] 4,032,247
[45] June 28, 1977

[54] LOCKABLE WEDGE

[76] Inventor: Kenneth G. Carter, 175 Virginia, Salt Lake City, Utah 84103

[22] Filed: Aug. 16, 1976

[21] Appl. No.: 714,594

[52] U.S. Cl. .............................. 403/409; 403/358; 403/374

[51] Int. Cl.² ............................................. F16B 2/14

[58] Field of Search .......... 403/409, 374, 358, 356, 403/320, 319, 318, 316, 211

[56] References Cited

UNITED STATES PATENTS

| 1,770,390 | 7/1930 | Cauldwell | 403/374 X |
| 3,722,932 | 11/1971 | Dougall | 403/409 X |
| 3,834,826 | 9/1974 | Simond | 403/409 X |

FOREIGN PATENTS OR APPLICATIONS

| 676,437 | 6/1929 | France | 403/358 |

Primary Examiner—Wayne L. Shedd
Attorney, Agent, or Firm—Trask & Britt

[57] ABSTRACT

A lockable wedge for securing heavy objects in place is disclosed. The wedge has typically a thin forward edge or face tapering to a thick rear edge or face with a longitudinally grooved, inclined surface connecting the forward edge to the upper junction of the rear edge and inclined surface. A substantially vertical tubular hole located near the rear edge communicates with said longitudinal groove. A stiff, bendable rod member shaped to have one end positioned in said hole and the remainder of the rod disposed within said groove and extending to a point near or beyond the forward edge of the wedge forms the locking element of the wedge. The wedge locks in place by having the wedge positioned such that the forward edge of the wedge extends beyond a vertical surface of the wedged object so that the forward end of the rod member may be bent into an upright position to prevent the wedge from being dislodged rearwardly.

10 Claims, 4 Drawing Figures

LOCKABLE WEDGE

BACKGROUND OF INVENTION

1. Field

The invention relates to wedges having means for securing the wedge in place to prevent dislodging. In particular, the invention relates to wedge and other securing means for holding the bowls of gyratory crushers in place.

2. Prior Art

Various means have been used to secure heavy parts of machinery together. Wedges and bolts being commonly used for such purposes.

In gyratory crushers, the holding of the bowl within the crusher housing requires heavy duty lugs and securing means. Examples of such systems is disclosed in Johnson, U.S. Pat. No. 3,281,083; Gruinder, U.S. Pat. No. 2,226,341; and Carter, U..S. Pat. No. 3,533,569. In Johnson, wedges are used to hold the bowl tightly in place, such wedges however are without locking means.

OBJECTS OF THE INVENTION

It is an object of the invention to provide a wedge which securely holds large objects in position without being jarred loose by vibration.

A further object of the invention is to provide a lockable wedge having a simplified locking mechanism.

Another object of the invention is to provide a lockable wedge having an easily replaceable locking mechanism.

It is a further object of the invention to provide a lockable wedge having a locking mechanism which locks said wedge at substantially any position along its length.

DESCRIPTION OF THE DRAWINGS

The invention is illustrated by the attached drawings wherein.

DESCRIPTION OF THE INVENTION

A lockable wedge for securing heavy objects in place has been invented. The wedge has a forward edge or face which is vertically thinner than the rear edge or face. The rear face has sufficient area to provide a strong impact area to accept blows with a sledge hammer. The wedge may be substantially square in cross-section or have an arch-shaped cross-section if the wedge is intended to fit in a rounded eye or coact with a rounded surface. Thus, the upper surface may be a flat, planar surface or a curvalinear surface. A substantially straight inclined upper surface connects the front face with the rear face. The lower surface is preferably planar and is preferably perpendicular to at least the rear surface. The upper surface and lower surface are not parallel to one another.

In the upper surface of the wedge is located a longitudinal groove which preferably extends substantially the entire length of the wedge to the top of the forward face. The longitudinal groove may also intersect the rear face at the top. A substantially vertical bore opens near the rear face of the wedge to intersect the longitudinal groove. The substantially vertical bore opening may pass through the wedge or at least extend a sufficient distance to provide a good anchor means for a rod which is bent to fit in the substantially vertical opening and in the longitudinal groove.

Further description of the subject invention may be facilitated by reference to the attached figures.

Figure 1:
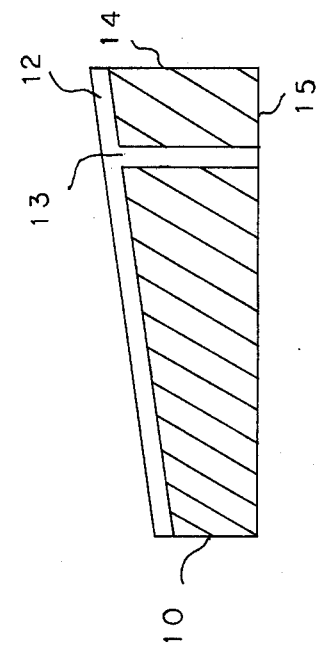
FIG. 1 is an elevational end view of the locking wedge.

The wedge is illustrated in an end-on elevational view in FIG. 1 showing the forward face 10, upper planar surface 11, groove 12 and vertical hole 13. Forward face 10 is preferably flat and has surface area sufficient to provide a striking surface since the wedge once driven in place must be occasionally struck with a sledge hammer to be dislodged.

Figure 2:
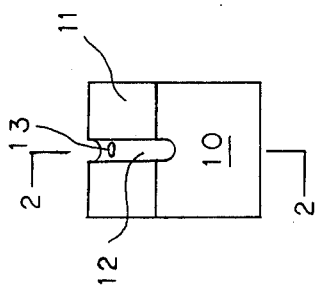
FIG. 2 is a cross-sectional view along section lines 2—2 of FIG. 1.

The cross-sectional view of FIG. 2 shows groove 12 extending the length of the upper surface of the wedge and vertical hole 13, i.e., the anchor hole, extending from the base 15 to groove 12. As heretofore indicated, groove 12 and hole 13 may not extend to the rear face and base, respectively. Groove 12 may terminate at its intersection with hole 13. The primary purpose in having groove 12 extend the length of the wedge is to facilitate ease of manufacture. Hole 13 should extend a sufficient depth to provide a good anchor for the bent rod (see FIG. 4), but for relatively thick wedges, i.e., wedges having a vertical thickness of more than 1 inch at the rear face, it is generally sufficient for the hole 13 to extend only about one-half the thickness of the wedge.

Hole 13 should be located near the rear face 14. The closer hole 13 is located to the front face 10 the less the useful length of the wedge is. The locking effect of hole 13 can also be achieved by moving hole 13 into the rear face 14, i.e., having a vertical groove in the rear face, however, the groove would become deformed by being struck with a sledge hammer and the rod 15 (see FIG. 3) could be dislodged to the rear of the wedge when it came into contact with the fixed surface of the object under which the wedge was being driven. Thus, hole 13 prevents rod 15 from moving longitudinally in either a forward or rearward direction and from rotating. Hole 13 should be located sufficiently forward of the rear face so as not to weaken the wedge. For a heavy duty wedge, locating hole 13 about one-half inch forward of the rear face is sufficient.

Figure 3:
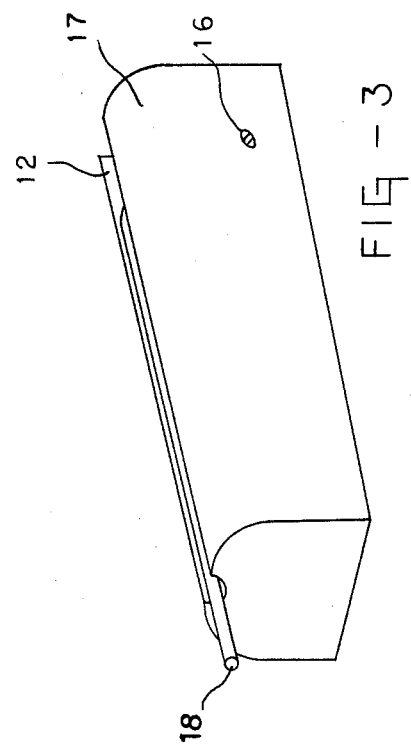
FIG. 3 is a perspective view of the locking wedge.

In FIG. 3 the wedge is shown in perspective view with rod 15 in groove 12. Rod 15 is illustrated as extending beyond forward face 10. Rod 15 may terminate at or before forward face 10, although there is generally no advantage to a shorter length. Rod 15 is preferably constructed of stiff metal, e.g., steel rod about one-eighth to about one-fourth inch in diameter. Set screw 16 may optionally be used to hold the rod 15 in hole 13 so that it is not dislodged during shipping, handling, etc. The wedge is constructed so that welding rods and similar rods usually available in machine shops, industrial plants and at construction sites may be used as rod 15. A straight rod can be bent to the correct configuration by inserting one end of the rod in hole 13 and then bending it to lie flat in groove 12.

Figure 4:
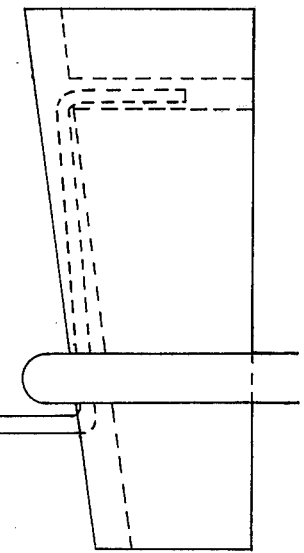
FIG. 4 is an elevational, side view of the locking wedge shown in a locked position.

The locking effect of rod 15 is relation to a lug having an eye through which the wedge fits is shown in FIG. 4. Groove 12 is preferably sufficiently deep so that rod 15 is not part of the wedge bearing surface although groove 12 may have a depth slightly less than the thickness of the rod so that the rod bends in place as the wedge is driven into place. Hole 13 is preferably only slightly larger in diameter than the rod intended to be used therein.

After the rod is placed in hole 13 and groove 12, the wedge is driven into place. Once the wedge is driven into place, the free end of rod 15 is bent upwardly adjacent the fixed object contacting the upper surface of the wedge. A rod which extends beyond forward face 10 is generally preferred since the free end of the rod can be easily contacted with a hammer, lever or the like to bend the rod into a locking position.

The upper surface 17 of the wedge shown in FIG. 3 is curvalinear. The transverse curve of surface 17 may be a segment of a circle, parabola or other geometric curve.

As shown in FIG. 4, the upward bend of rod 15 prevents the wedge from being dislodged to the rear. Both ends of rod 15 must be bent to hold the wedge in place; one end of the rod must be bent against the forward face of the fixed object while the rear end of the rod must bear against a rear-facing surface of the wedge.

The rear portion of rod 15 could be bent downwardly against rear face 14, but if the rod were twisted 90° the locking effect could be lost. The presence of the fixed object bearing on the upper surface of groove 12 precludes rod 15 from being dislodged upwardly from hole 13.

The lockable wedge of this invention is particularly useful in securing in place heavy parts having an open lug or ear wherein the wedge passes through or under the lug. The locking feature of the wedge coacts well with such lugs since the lugs are relatively thin in respect to the length of the wedge.

I claim:

1. A lockable wedge for wedging two parts together in a manner that the wedge cannot be easily dislodged comprising a metal wedge member having a forward face and a rear face, said rear face being vertically thicker than said forward face, and an upper bearing surface tapering from the top of the forward face to the top of the rear face, said upper surface having a longitudinal groove therein extending from a position near said rear face to a position near said forward face, said longitudinal groove intersecting a substantially vertical tubular hole near said rear face, said groove and tubular hole adapted to receive a rod member having one short end bent at a substantially right angle to the remainder of the rod.

2. The wedge of claim 1 wherein said longitudinal groove extends from said forward face to said rear face.

3. The wedge of claim 1 wherein said substantially vertical tubular hole extends from said longitudinal groove to the base of said wedge.

4. The wedge of claim 1 wherein said rod is from about one-eighth to about one-fourth inch in diameter.

5. The wedge of claim 1 wherein said substantially vertical tubular hole is intersected with set screw means.

6. The wedge of claim 1 wherein said groove is substantially the same depth as the diameter of the rod it is adapted to receive.

7. The wedge of claim 1 wherein said upper bearing surface is a flat, planar surface.

8. The wedge of claim 1 wherein said upper bearing surface has a curvalinear surface.

9. The wedge of claim 1 wherein said longitudinal groove has a depth slightly less than the thickness of the rod it is adapted to receive.

10. A combination lockable wedge and locking device for wedging two parts together in a manner that the wedge cannot be easily dislodged comprising:
 a. a metal wedge member having a forward face and a rear face, said rear face being vertically thicker than said forward face, and an upper bearing surface tapering from the top of the forward face to the top of the rear face, said upper surface having a longitudinal groove therein extending substantially the length of the wedge member, said longitudinal groove intersecting a substantially vertical tubular hole near said rear face; and
 b. a rod member having a bent end residing in said tubular hole and an unbent longer portion disposed in said groove.

* * * * *